United States Patent [19]

Hisazumi et al.

[11] Patent Number: 5,084,310
[45] Date of Patent: Jan. 28, 1992

[54] SMOKED FOOD-PACKAGE AND SMOKING PROCESS

[75] Inventors: Nobuyaki Hisazumi; Tsutomu Uehara, both of Tsuchiura; Hiroyuki Ohba, Ibaraki; Kazuhiko Hirose, Abiko, all of Japan

[73] Assignee: Kureha Kagaku Kogyo Kabushiki Kaisha, Tokyo, Japan

[21] Appl. No.: 500,040

[22] Filed: Mar. 27, 1990

Related U.S. Application Data

[63] Continuation-in-part of Ser. No. 332,823, Apr. 4, 1989, Pat. No. 4,992,311.

[30] Foreign Application Priority Data

Apr. 8, 1988 [JP] Japan ................................ 63-86673
Apr. 3, 1989 [EP] European Pat. Off. ........ 89303272.2
Apr. 4, 1989 [JP] Japan .................................... 1-85455

[51] Int. Cl.⁵ .......................... B65D 81/34; A23L 1/31
[52] U.S. Cl. ...................................... 428/34.8; 426/105; 426/129; 428/35.4
[58] Field of Search ............................ 428/34.8, 35.4; 426/105, 129

[56] References Cited

U.S. PATENT DOCUMENTS

| | | | |
|---|---|---|---|
| 4,399,839 | 8/1983 | Hutschenreuter et al. | 138/118.1 |
| 4,647,509 | 3/1987 | Wallace et al. | 428/475.8 |
| 4,755,402 | 7/1988 | Oberle | 428/34.9 |
| 4,764,406 | 8/1988 | Hisazumi et al. | 428/34.8 |
| 4,851,245 | 7/1989 | Hisazumi et al. | 426/105 |
| 4,892,765 | 1/1990 | Hisazumi et al. | 428/34.8 |
| 4,992,311 | 2/1991 | Hisazumi et al. | 428/35.4 |

FOREIGN PATENT DOCUMENTS 53060954 11/1976 Japan .
54129047 12/1976 Japan .
1397472 6/1975 United Kingdom .

OTHER PUBLICATIONS

Chem. Abst., vol. 104, No. 15, Abstract No. 128645x.
Chem. Abst., vol. III, No. 9, Abstract No. 76743a.
Chem. Abst., vol. 111, no. 9, Abstract No. 76740x.
Chem. Abst., vol. 111, No. 9, Abstracts No. 76745c.
Chem. Abst., vol. 108, No. 18, Abstract No. 151839e.

Primary Examiner—James J. Seidleck
Attorney, Agent, or Firm—Nixon & Vanderhye

[57] ABSTRACT

Disclosed herein is a smoked food-package produced by packaging a foodstuff with a smokable packaging material and smoking the packaged foodstuff wherein the smokable packaging material comprises at least one layer of a mixture of 5 to 60% by weight of vinylidene chloride resin and 95 to 40% by weight of polyamide, said smokable packaging material having a practical smokability, high oxygen barrier property and high water vapor barrier property, and a smoking process.

5 Claims, No Drawings

SMOKED FOOD-PACKAGE AND SMOKING PROCESS

CROSS-REFERENCE TO RELATED APPLICATION

This application is a continuation-in-part of application Ser. No. 332,823, filed on Apr. 4, 1989 now U.S. Pat. No. 4,992,311.

BACKGROUND OF THE INVENTION

The present invention relates to a smoked food package and a smoking process. Further this invention particularly relates to a smoked food package which is excellent in a smokability, an oxygen-barrier property and a water vapor barrier property and has preserving effect without secondary-packaging with plastic bags, and which also is produced by packaging a foodstuff with a smokable film and smoking the packaged foodstuff wherein the smokable film comprises at least one layer of a mixture of 5 to 60% by weight of vinyliden chloride resin (hereinafter referred to as PVDC) and 95 to 40% by weight of polyamide.

Hitherto, the packages for foodstuffs such as processed meat which is to be smoked is mainly conducted by primary packaging and secondary packaging. For primary packaging, a packaging material is selected so that it is suitable for forming and maintaining the shape of foodstuffs which are packed directly into the packaging material, and for rapidly permeating smoke components during the smoking process. As examples of packaging materials used for primary packaging, casings made from animal intestines such as those of cows, pigs, or sheep, and cellulose casings made of viscose film may be mentioned. These smokable primary packaging materials, however, lack gas-barrier properties and are unsuitable as packaging materials for ordinary food-storage. Therefore, it is necessary to package the foodstuffs again in a film which has a gas-barrier property (secondary packaging).

Other known smokable primary packaging materials are films of natural polymer such as collagens, chitins and polysaccharides, or paper which is impregnated with a polyvinyl alcohol resin [Japanese Patent Publication No. 57-43198 (1972)], paper impregnated with an ethylene-vinyl alcohol copolymer containing a plasticizer [Japanese Patent Application Laid-Open (KOKAI) No. 52-57347 (1977)], and polyester copolymer films containing polyalkylene oxide [Japanese Patent Publication No. 59-117530 (1984)]. These smokable primary packaging materials also have insufficient gas-barrier property, and thus necessitate a secondary packaging for the preservation of the food. Although films which are mechanically perforated or porous films have been proposed in order to improve the smoking properties (British Patent No. 1,397,472), these packaging materials also necessitate secondary packaging. Thus, conventional smokable packaging materials require a secondary packaging process, and as a result there are defects of the increases of the number of manufacturing steps, packaging materials, and packaging machines, and thus increase the manufacturing cost.

As known films having both smoke-permeability and oxygen gas-barrier property, there are films of polyamides such as polycaprolactum and of polymer blends of polyamide and at least one of ionomer resin, modified ethylenevinyl acetate copolymer and modified polyolefin (European Patent Application No. 0,139,888A1).

European Patent Application No. 0,139,888A1 suggests that films consisting of polyamides which can absorb at least 3 wt % of their own weight of water up to saturation point, such as, for example, polycaprolactam, polyaminooenanthic acid amid, polyhexamethylene adipamide and polyhexamethylene sebacamide, and films consisting of polymer blends of polyamides such as those described above, and at least one of ionomer resin, modified ethylene-vinyl acetate copolymer and modified polyolefin, are useful as smokable thermoplastic synthetic casings. However, the only films that are concretely disclosed therein are transparent, colorless shrinkable casings formed of polycaprolactam or polyhexamethylene adipamide. The casings of polycaprolactam and polyhexamethylene adipamide show an insufficient oxygen barrier property under high humidity and an insufficient water vapor barrier property.

On the other hand, European Patent Application No. 0216094A1 (U.S. Pat. No. 4,851,245) discloses a smokable food-packaging film comprising at least one layer of a mixture of 50 to 90 wt % polyamide and 10 to 50 wt % copolymer of α-olefin and vinyl alcohol, which has the properties of a permeability to 50% concentration methanol of not less than 200 g/m$^2$.day.atm at a temperature of 60° C. and a relative humidity of 0% and an oxygen gas-permeability of not more than 50 cc/m$^2$.day.atm at a temperature of 30° C. and a relative humidity of 60%.

However, a water vapor barrier property of this film is not always sufficient for every uses.

When an oxygen barrier property is insufficient, the prolonged storage periods of foods, in particular, for foodstuffs which are susceptible to oxygen becomes inadequate.

Further, in the case of a water vapor barrier property is insufficient the water content of the product decreases during preservation and distribution of product, the weight of product decreases too, and such quality as taste, color or size changes. In the result, wrinkles in package occurs and a product value diminishes.

Accordingly, it is an object of the present invention to provide a smoked food package which has an excellent smokability, a high oxygen barrier property and a high water vapor barrier property and which can preserve a food stuff susceptible to oxygen for a long time by packaging a food stuff with a thermoplastic resin having an excellent smokability, oxygen barrier property and water vapor barrier property.

As a result of various studies into how to achieve this object, the present inventors found that the packaging material obtained from a resin mixture of PVDC and polyamide mixed in a specified ratio can attain this object.

SUMMARY OF THE INVENTION

In the first aspect of the present invention, there is provided a smoked food package which is produced by packaging a foodstuff with a smokable packaging material comprising at least one layer of a mixture of 5 to 60% by weight of PVDC and 95 to 40% by weight of polyamide and smoking the packaged foodstuff.

In the second aspect of the present invention, there is provided a smoked food package which is produced by packaging a food stuff with a smokable packaging material comprising at least a layer of a mixture of 5 to 60% by weight of PVDC and 95 to 40% by weight of polyamide, said layer having an oxygen permeability coefficient of not more than $2.0 \times 10^{-11}$ cc.cm/cm$^2$.sec.cmHg at a temperature of 30° C. and a relative humidity of 100%, and a water vapor transmission rate in the thickness of 30 μm of not more than 150 g/m$^2$.day at a temperature of 40° C. and relative humidity of 90%, and smoking the packaged foodstuff.

In the third aspect of the present invention there is provided a smoked food package which is produced by packaging a food stuff with a smokable film or container comprising at least one layer of a mixture of 5 to 60% by weight of PVDC and 95 to 40% by weight of polyamide and smoking the packaged food stuff. In the fourth aspect of the present invention there is provided a smoking process comprising packaging a foodstuff with an above-described smokable packaging material and smoking the packaged foodstuff.

DETAILED DESCRIPTION OF THE INVENTION

A smoked food package according to the present invention is the smoked package produced by packaging a foodstuff with a smokable packaging material which comprises at least one layer of a mixture of 5 to 60% by weight of PVDC and 95 to 40% by weight of polyamide, the layer having an excellent smokability and gas barrier properties, and smoking the packaged foodstuff.

The resin composition of the present invention comprises 5 to 60% by weight of PVDC and 40 to 95% by weight of a polyamide.

As PVDC used in the present invention, a copolymer mainly comprising vinylidene chloride, preferably a copolymer of 65 to 98% by weight of vinylidene chloride with 2 to 35% by weight of at least one monomer copolymerizable with vinylidene chloride is used. As the monomer copolymerizable with vinylidene chloride, for instance, a monomer selected from the group consisting of vinyl chloride, acrylonitrile, alkyl acrylate (carbon number in the alkyl group being 1 to 18), alkyl methacrylate (carbon number in the alkyl group being 1 to 18), acrylic acid, methacrylic acid, etc. is preferably. In the case where the amount of vinylidene chloride is less than 65% by weight, the copolymer becomes rubbery at normal temperature and is poor in gas-barrier property. On the other hand, in the case where the amount of vinylidene chloride is more than 98% by weight, the melting point of the copolymer becomes high and the copolymer is apt to decompose thermally and the stable melt-extruding becomes difficult.

A small amount of a plasticizer, a stabilizer, a lubricant, an antioxidant, and a pigment can be added to the PVDC as required.

As the polyamide mixed with PVDC, a polyamide having a low crystalline melting point of not higher than 210° C., preferably not higher than 200° C., is used. The crystalline melting point of the polyamide in the present invention is shown by the temperature showing the maximum value on the melting curve obtained when 8 to 10 mg of the resin is heated at a temperature-raising speed of 20° C./min while using a differential scanning calorimeter (made by Mettler Co. model TA-3000.

As the monomer constituting the polyamide, for instance, a straight chain ω-aminocarboxylic acid of carbon number of $C_6$ to $C_{12}$, the lactam thereof, adipic acid, sebacic acid, dodecanedicarboxylic acid, heptadecanedicarboxylic acid, hexamethylenediamine, isophthalic acid, bis-(4-aminocyclohexyl)-methane, 2,2-bis-(4'-aminocyclohexyl)-propane, terephthalic acid or dimethyl ester thereof, 1,6-diamino-2,2,4-trimethyl-hexane, 1,6-diamino-2,4,4-trimethylhexane, 1-amino-3-amino--methyl-3,5,5-trimethylcyclohexane, etc. are preferable, and polymer, copolymer and the mixture thereof formed from the above-mentioned monomer is used. Among these products, nylon 6-69 (copolymer of nylon 6 and nylon 66), nylon 6-69 (co-polymer of nylon 6 and nylon 69), nylon 6- 11 (copolymer of nylon 6 and nylon 11), nylon 11, nylon 12, nylon 6-12, nylon 6-66-610 (copolymer of nylon 6, nylon 66 and nylon 610), nylon 6-66-610-612 (copolymer of nylon 6, nylon 66, nylon 610 and nylon 612), etc. is suitable.

In the case where polyamide having a crystalline melting point of higher than 210° C. is mixed with PVDC, the extruding temperature becomes high in a melt-extruding of the resin composition and PVDC is apt to decompose thermally and stable melt-extruding becomes difficult. Further, as the polyamide, a polyamide having a low glass transition temperature (Tg) of preferably not higher than 55° C., more preferably not higher than 47° C. is used.

The glass transition temperature of the polyamide is determined while following DIN 53445 and using a Torsion Pendurum Analyzer (made by RHESCA Co. model TPA-10).

A sheet obtained by cooling gradually a press sheet of each polyamide and crystallizing is used as the sample.

As the mixture ratio of PVDC and polyamide, 5 to 60% by weight, preferably 20 to 50%, more preferably 20–40% by weight of PVDC and 95 to 40% by weight, preferably 80 to 40%, more preferably 80 to 60% by weight of oiktanude were used.

In the case where the content of PVDC in the resin composition of the present invention is not more than 5% by weight, the oxygen permeability coefficient, water vapour transmission rate becomes large resulting in the poor gas-barrier property and it becomes difficult to preserve the food stuff packaged for the long time. On the other hand, in the case where the content of polyamide is less than 40% by weight, the smokability also lowers, it becomes difficult to obtain a smokable food packaging material having the properties of the present invention.

The mixed composition of PVDC and a polyamide of the present invention is melt-molded into films, sheets, or is injection molded or blow molded into bottle or container etc. Further these film and sheet can be molded to the container by a deep drawing or a compression-mold etc.

The films, sheets or containers may be stretched and not stretched. The molded product may be the product containing at least one layer comprising the thus formed composition, and it is possible to laminate the layer with the other resin layers in the range of not impede the object of the present invention. As the resin for forming the other resin layer, polyolefin such as polyethylene, polypropylene, ethylene-propylene copolymer, ethylene-vinylacetate copolymer, ethylene-acrylic acid copolymer, ethylene-ethylacrylate copolymer etc., ionomer, polyester such as polyethylene-terephthalate, polybutyleneterephthalate etc., polyamide, polycarbonate, polyvinylalcohol, saponified ethylene-vinylacetate copolymer, cellophane etc. may be mentioned.

The thickness of the smokable food-packaging film or container according to the present invention is preferably 10 to 150 μm, more preferably 15 to 100 μm. In a laminate structure, the thickness of the mixed resin layer having a mixture of PVDC and polyamide is preferably 5 to 100 μm, and the thickness of the other layer(s) is preferably 5 to 140 μm.

The packaging material comprising at least one layer of a mixture of PVDC and polyamide has a practical smokability.

A practical smokability in the present invention means a smokability having both a taste and flavor of over 1 (an average value of ten panelists) in the evaluation result of a sensory examination (panel tests).

The panel test is performed as follows by ten panelists.

Namely, pork sausage meat was packed into tubular casing (thickness: 30 μm) and both ends of each casing were sealed. This sausage package was smoked at 75° C. for 30 minutes under humidity and then were subjected to sensory examination with respect to the taste and flavor of the contents.

The evaluations of the sensory examination are as follows.
0: No smokability (smoking has no effect)
1: Slightly recognizable smoked taste and flavor.
2: Clearly recognizable smoked taste and flavor.
3: Strongly recognizable smoked taste and flavor.
4: Extremely strong smoked taste and flavor.

Further, the smokability of packaging material of the present invention is specified by measuring a permeability of methanol gas to the packaging material, said methanol gas being one of the smoking components.

Namely, the permeability to 60% concentration of methanol of a film according to the present invention is not less than $6.0 \times 10^{-8}$ cc.cm/cm$^2$. sec.cmHg, preferably not less than $7.0 \times 10^{-8}$ cc.cm/cm$^2$.sec.cmHg at a temperature of 60° C. and a relative humidity of 0%.

A film having a methanol-permeability of less than $5.0 \times 10^{-8}$ cc.cm/cm$^2$.sec.cmHg cannot exhibit any smoking effect, even with food which needs only a slight taste and flavor of smoking.

"The concentration of methanol" in the present invention is the relative concentration when the concentration under the saturated vapor pressure of methanol at the temperature is set as 100%.

To measure the methanol-permeability, a piece of film was inserted into a gas-permeability measuring cell of a YANAKO GTR 10XL (tradename, manufactured by Yanagimoto Seisakusho Co., Ltd.), methanol vapor diluted to a concentration of 60% by nitrogen at 60° C. and 0% RH was brought into contact with one side of the film, while nitrogen gas at 60° C. and 0% RH was brought into contact with the other side of the film, and the quantity of methanol which permeated the film was determined by gas chromatography.

It is necessary that the film has oxygen barrier property which is exhibited by an oxygen permeability coefficient of less than a predetermined value, in order to preserve the smoked food for long periods. The oxygen permeability coefficient of a film according to the present invention is not more than $2.0 \times 10^{-11}$ cc.cm/cm$^2$.sec.cmHg, preferably not more than $1.5 \times 10^{-11}$ cc.cm/cm$^2$.sec.cmHg, more preferably $1.0 \times 10^{-11}$ cc.cm/cm$^2$.sec.cmHg at a temperature of 30° C. and a relative humidity of 100%. Although ordinary food does not need secondary packaging if it is packaged with a film having an oxygen permeability of more than $2.0 \times 10^{-11}$ cc.cm/cm$^2$.sec.cmHg, food which is particularly susceptible to oxygen cannot be preserved for long periods in such a film, so that secondary packaging is necessary.

Further, the water vapor transmission rate of the packaging material of 30 μm in thickness is not more than 150 g/m$^2$.day, preferably not more than 100 g/m$^2$.day, more preferably not more than 80 g/m$^2$.day at a temperature of 40° C. and a relative humidity of 90%.

In the case of the water vapor transmission rate of over 150 g/m$^2$.day, the water content of product decreases during preservation and distribution of product after smoking treatment, the weight of product decreases too, and such product quality as taste, color or size changes. In the result, wrinkles in package occurs and a product value diminishes.

Foodstuffs which are to be packaged in the food-package according to the present invention have need of a smoking process and a good preservability during prolonged storage periods. Meat products such as ham, sausages, bacon and meat, dairy products such as cheese, processed fish meet products such as fish and shellfish, and processed eggs may be exemplified.

The smoked food package according to the present invention is manufactured by packaging foodstuffs with above-mentioned packaging material in the ordinary process.

In the smoking process in the present invention, a package which is formed in an ordinary packaging process and optionally is dried, is placed in smoke chamber for a predetermined period (the period depends upon the food being smoked and is from several minutes to several hours), at a temperature of 15° to 80° C. The smoking temperature can be selected to be 15 to 30° C. (cold-smoking method), 30° to 50° C. (warm-smoking method), or 50° to 80° C. (hot-smoking method), but warm smoking and hot smoking methods which are capable of mass-production at a high temperature in a short period of time are preferable. The smoking may be conducted by an electrical smoking method in which an electric field is applied to an atmosphere of smoke of a hard wood such as oak and cherry wood, in an ordinary way.

The smoked food package according to the present invention is produced by packaging foodstuffs with the packaging material having at least a layer comprising the mixture of PVDC and polyamide of a specified ratio. Therefore, the smoked food package can have a practical smokability, high oxygen barrier property and high water vapor barrier property. In the result, even foodstuffs which is susceptible to oxygen, for example, ham, sausage, bacon, meats and cheese etc. are able to be preserved for a long time after the smoking treatment without a secondary package. Further, because the smoked food package according to the present invention has an excellent water vapor barrier property, the water content of the product scarcely decreases for a long time of preservation and in the result the smokable food package having a wrinkle-less excellent appearance can be obtained.

The present invention will be explained hereinunder with reference to embodiments thereof.

EXAMPLES 1-6, COMPARATIVE EXAMPLES 1-6

Polyamide (made by EMS CHEMI AG Co., Grilon CF6S) which is copolymer of monomer component of Nylon 6 and Nylon 12, has crystalline melting point of 130° C. and glass transition temperature of 30° C. and PVDC (PVDC-1) which is copolymer of 80% by weight of vinyliden chloride and 20% by weight of vinyl chloride were mixed in the ratio of the weight as shown in Table 1.

Afterward, the mixed resin was melt extruded from an extruder provided with a circular die and was rapidly chilled by water at 15° C. The thus obtained tubular parison was heated and air was blown into the parison immediately to inflation-stretch the parison at the ratio of lengthwise direction (MD)/breadthwise direction (TD)=2.5/2.5, thereby a stretched film of 30 μm in thickness was obtained (Examples 1-3).

The oxygen-permeability coefficient at a temperature of 30° C. and relative humidity of 100% of the films of example 1-3 was measured according to ASTMD3985. Further, water vapor transmission rate at a temperature of 40° C. and relative humidity of 90% was determined according to JIS Z-0208. Methanol permeability coefficient was measured by above mentioned measuring method.

These results were shown in Table 1. The tubular films of Examples 1, 2 and 3 were filled with about 200 g of pork sausage meat of 50 wt % pork, 20 wt % fat, 6 wt % starch, 2 wt % salt and 22 wt % water, and both ends of each sausage were clipped, thereby sausages of Examples 1, 2 and 3 were obtained. Each sausage was dried in a smoke chamber for 15 minutes at a temperature of 60° C. and a relative humidity of 20%, and was thereafter smoked for 30 minutes at a temperature of 75° C. and a relative humidity of 50%. The smokability of the films of Examples 1, 2 and 3 were examined by the above-described sensory examination (panel tests), the results being shown in Table 1.

On the other hand, PVDC-2 which is a copolymer of 95% by weight of vinylidene chloride and 5% by weight of methyl acrylate and Grilon CF6S were dry blended in the weight ratio as shown in Table 1, thereafter a tubular stretched film having thickness of 30 μm was obtained according to the process of examples 1-3 (examples 4-6, comparative example 6).

The sensory test for smokability, oxygen permeability coefficient, water vapor transmission rate, and methanol permeability coefficient were measured by the same method as that of examples 1-3. The results were shown in Table 1. For comparative example, films of thickness of 30 μm of cellulose, PVDC-1, PVDC-2 and polyamide were used, and the same examination was carried out. The results were described in Table 1.

TABLE 1

| | Material | Composition ratio, wt % | Sensory Test for Smokability Taste, | Sensory Test for Smokability Fravor | Oxygen Permeability Coefficient cc.c/cm$^2$.sec.cmHg | Water Vapor Transmission rate g/m$^2$.day | Methanol-Permeability Coefficient cc.cm/cm$^2$.sec.cmHg |
|---|---|---|---|---|---|---|---|
| Comparative Example 1 | Cellulose | | 4 | 4 | $1.0 \times 10^{-10}$ | 2000 | $8.4 \times 10^{-7}$ |
| Comparative Example 2 | PVDC-1 | | 0 | 0 | $6.9 \times 10^{-13}$ | 6 | $0.1 \times 10^{-7}$ |
| Comparative Example 3 | Polyamide*[1] | | 2 | 2 | $3.0 \times 10^{-11}$ | 150 | $2.4 \times 10^{-7}$ |
| Comparative Example 4 | PA-1*[2] | | 2 | 2 | $2.3 \times 10^{-11}$ | 200 | $2.3 \times 10^{-7}$ |
| Example 1 | PA-1/PVDC-1 | 80/20 | 2 | 2 | $6.8 \times 10^{-12}$ | 30 | $2.0 \times 10^{-7}$ |
| Example 2 | PA-1/PVDC-1 | 60/40 | 2 | 2 | $3.7 \times 10^{-12}$ | 15 | $1.5 \times 10^{-7}$ |
| Example 3 | PA-1/PVDC-1 | 40/60 | 1 | 1 | $2.5 \times 10^{-12}$ | 10 | $0.9 \times 10^{-7}$ |
| Example 4 | PA-1/PVDC-2 | 80/20 | 2 | 2 | $5.3 \times 10^{-12}$ | 20 | $2.0 \times 10^{-7}$ |
| Example 5 | PA-1/PVDC-2 | 60/40 | 2 | 2 | $4.6 \times 10^{-13}$ | 10 | $1.4 \times 10^{-7}$ |
| Example 6 | PA-1/PVDC-2 | 40/60 | 1 | 1 | $3.0 \times 10^{-13}$ | 5 | $0.8 \times 10^{-7}$ |
| Comparative Example 5 | PVDC-2 | | 0 | 0 | $1.0 \times 10^{-13}$ | 1 | $0.09 \times 10^{-7}$ |
| Comparative Example 6 | PA-1/PVDC-2 | 20/80 | 0 | 0 | $1.6 \times 10^{-13}$ | 2 | $0.4 \times 10^{-7}$ |

*[1]Polyamide; Nylon 6 Tm = 223° C. (Made by Toray Co., Amilan CM-1021)
*[2]PA-1; Nylon 6-12 copolymer (Made by EMS CMEMI AG Co., Grilon CF6S)

Though cellulose film has an excellent smokability, oxygen permeability coefficient and water vapor transmission rate are high and accordingly requires a secondary packaging (comparative example 1). The other way PVDC film has a low oxygen gas permeability coefficient and vapor transmission rate, but has scarcely smokability (comparative examples 2 and 5). Further, polyamide film has a sufficient smokability but a high oxygen permeability coefficient and water vapor transmission rate (comparative example 3, 4). From this Table 1, it was found that the mixed resin of polyamide and PVDC containing polyamide 80–40% by weight has a low oxygen permeability coefficient and water vapor transmission rate and a practical smokability. Thus, the mixed resin is a very balanced package material.

EXAMPLES 7-11

The weight ratio of polyamide and PVDC-1 is 80:20 and polyamides of different sorts were used as shown in Table 2.

Each sample was dry-blended, and then the parison obtained by melt-extruding the mixed resin from extruder provided with a circular die was blown molded by an air pressure, thereby a stretched film of 30 μm in thickness was obtained. The oxygen permeability coefficient, the water vapor transmission rate, the smokability and the methanol permeability coefficient were measured and the results were shown in Table 2.

TABLE 2

| | Material | Composition ratio, wt % | Sensory Test for Smokability | | Oxygen Permeability Coefficient cc.c/cm².sec.cmHg | Water Vapor Transmission rate g/m².day | Methanol-Permeability Coefficient cc.cm/cm².sec.cmHg |
|---|---|---|---|---|---|---|---|
| | | | Taste, | Flavor | | | |
| Example 7 | PA-2[*1]/PVDC-1 | 80/20 | 2 | 2 | $9.0 \times 10^{-12}$ | 40 | $2.0 \times 10^{-7}$ |
| Example 8 | PA-3[*2]/PVDC-1 | 80/20 | 2 | 2 | $1.0 \times 10^{-11}$ | 45 | $1.8 \times 10^{-7}$ |
| Example 9 | PA-4[*3]/PVDC-1 | 80/20 | 2 | 2 | $8.6 \times 10^{-12}$ | 50 | $2.2 \times 10^{-7}$ |
| Example 10 | PA-5[*4]/PVDC-1 | 80/20 | 2 | 2 | $8.5 \times 10^{-12}$ | 48 | $2.1 \times 10^{-7}$ |
| Example 11 | PA-6[*5]/PVDC-1 | 80/20 | 3 | 3 | $7.0 \times 10^{-12}$ | 43 | $2.6 \times 10^{-7}$ |

[*1]: PA-2: Nylon 11, Tm = 190° C. (made by ATOCHEM Co., Rilsan BESV OA), Tg = 46° C.
[*2]: PA-3: Nylon 12, Tm = 180° C. (made by Ube Co., 3035 U), Tg = 42° C.
[*3]: PA-4: Nylon 6-66 copolymer (Polymerization ratio = 80/20), Tm = 197° C. (made by Toray Co., Amilan CM 6041), Tg = 50° C.
[*4]: PA-5: Nylon 6-12 copolymer (Polymerization ratio = 90/10), Tm = 204° C. (made by EMS CHEMI AG Co., Grilon CR 9), Tg = 44° C.
[*5]: PA-6: Nylon 6-66-610 copolymer, Tm = 153° C. (made by Toray Co., Amilan CM 4000), Tg = 32° C.

Even if the sorts of polyamide were changed, it was found from the table 2 that the oxygen permeability coefficient and the water vapor transmission rate of the mixed resin were low and the smokability was sufficient and the mixed resin was a very balanced packaging material.

What is claimed is:

1. A smoked food package produced by packaging a foodstuff with a smokable packaging material and smoking the packaged foodstuff, wherein the smokable packaging material comprises at least one layer consisting essentially of a mixture of 5 to 60% by weight of vinylidene chloride resin and 95 to 40% by weight of polyamide.

2. A smoked food package according to claim 1, wherein the smokable packaging material comprises at least one layer consisting essentially of a mixture of 20 to 60% by weight of vinylidene chloride resin and 80 to 40% by weight of polyamide.

3. A smoked food package according to claim 1, wherein the smokable packaging material has an oxygen permeability coefficient of not more than $2.0 \times 10^{-11}$ cc.cm/cm².sec.cmHg at a temperature of 30° C. and a relative humidity of 100%, and a water vapor transmission rate at a thickness of 30 μm of not more than 150 g/m².day at a temperature of 40° C. and a relative humidity of 90%.

4. A smoked food package according to claim 1, wherein the smokable packaging material is film or sheet.

5. A smoked food package according to claim 1, wherein said polyamide has a crystalline melting point of not higher than 210° C.

* * * * *